United States Patent

[11] 3,591,069

| [72] | Inventors | William C. Heller, Jr.; |
| | | Donald W. Davis, both of Milwaukee, Wis. |
| [21] | Appl. No. | 872,080 |
| [22] | Filed | Oct. 29, 1969 |
| | | Division of Ser. No. 531,899, |
| | | Mar. 4, 1966, abandoned. |
| [45] | Patented | July 6, 1971 |
| [73] | Assignee | William C. Heller, Jr. |
| | | Milwaukee, Wis. |
| | | by said Donald W. Davis |

[54] WINDOW CONTAINER PACKAGING MATERIAL
12 Claims, 7 Drawing Figs.

[52] U.S. Cl. ................................................. 229/37,
156/108, 161/114, 229/3.5, 206/45.31
[51] Int. Cl. ........................................................ B65d 27/04
[50] Field of Search .......................................... 229/37, 87,
3.1; 206/45.31; 156/108, 252, 280, 514; 229/71,
3.5; 161/114

[56] References Cited
UNITED STATES PATENTS

| 2,511,303 | 6/1950 | Stevens et al. ................ | 156/108 |
| 2,750,096 | 6/1956 | Misch ........................... | 229/51 IS |
| 3,379,102 | 4/1968 | James et al. .................. | 229/3.1 |

*Primary Examiner*—David M. Bockenek
*Attorney*—Andrews, Sceales, Starke & Sawall ABSTRACT: A packaging material for containers having coated window openings therein for viewing the contents. The window openings are formed in a container base sheet and covered by a transparent window sheet secured to the base sheet. The window sheet and base sheet are covered with a layer of transparent film to provide a window container packaging material having improved resistance to rupture and leakage.

Inventor
W. C. HELLER JR.
D. W. DAVIS
By Daniel D. Fetterley
Attorney

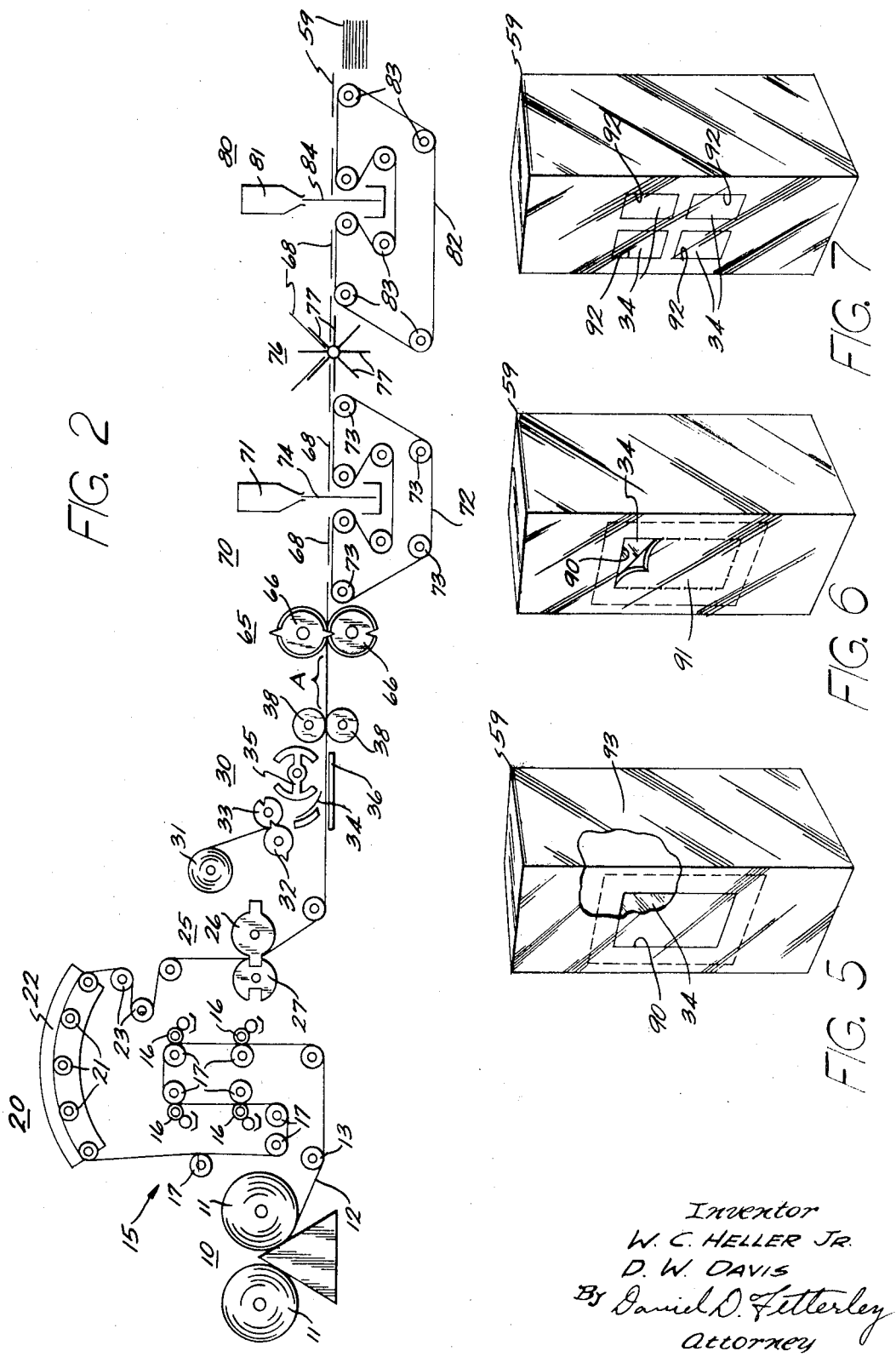

WINDOW CONTAINER PACKAGING MATERIAL

CROSS REFERENCES TO RELATED APPLICATIONS

This application is a divisional application of our copending application, Ser. No. 531,899, filed Mar. 4, 1966 which is now abandoned.

BACKGROUND OF THE INVENTION

1. Field of the Invention

The present invention relates to a packaging material for window containers constructed of paperboard and the like.

2. Description of the Prior Art

In the packaging industry, it has become common practice to provide disposable containers for liquids such as milk and juices as well as for a variety of other products, including granular products, for purposes of economy and convenience. In many cases, it is desirable to provide windows or sight openings in such containers for viewing the contents. While plastic containers have recently enjoyed considerable commercial acceptance, due primarily to the relatively attractive appearance and variance in designs thereof and the ability to readily render the plastic transparent or translucent in whole or in part, the materials required for fabricating these plastic containers are expensive and result in undesirably high costs which must be absorbed by the ultimate consumer. In addition, these plastic containers are of a fixed shape and are therefore bulky and incapable of being knocked down or folded, thereby causing shipping and storage problems.

Paperboard, on the other hand, is an inexpensive material. However, the paperboard sheets are opaque and nontransparent and are incapable of being rendered transparent. If window or sight openings are desired, they must, therefore, be specially formed as by diecutting or the like, and the problems of covering the openings with a transparent material while maintaining liquidproofness and container integrity are then presented.

While windowed containers, of the paperboard type have been provided in the past, these containers have been invariably characterized by the use of but a single membrane across the window opening. U.S. Pat. No. 3,336,845 to Lepisto et al. is typical of the simplest form of windowed container construction. This construction, while simple, has severely restricted the use of such containers because of the likelihood of membrane rupture due to the weight of the contents of the container and because of the danger of leakage around the edges of the window.

To improve container construction, a window membrane has been sandwiched between a pair of plies having aligned window openings so that the plies frame the window. The membrane is held in position by glue. See for example, U.S. Pat. No. 2,511,303 to Stevens et al. The use of a number of plies of base sheet material and of adhesives for the plies and window membrane increases the cost of the resulting container. In addition, while framing the window membrane may solve the leakage problem, the rupture problem still remains.

Another approach which may be employed is to preform the window with a peripheral sealing means. The preformed window is applied to the container and the sealing means used to affix the window to the container in a leakproof manner. See, U.S. Pat. No. 2,172,864 to Calva et al. and U.S. Pat. No. 2,532,857 to Ricciardi. However, this construction is even more expensive than the framed construction and is generally suited only for specialized applications.

SUMMARY OF THE PRESENT INVENTION

In contrast to the structures of the prior art, the packaging material of the present invention is possessed of great economy and provides windowed containers which have improved resistance to rupture and leakage.

In essence, the structure of the present invention utilizes a coating film over the window to both assist in affixing the window member to the base material and for providing resistance to rupture and leakage. Such a structure is in complete contradistinction to the prior art which has invariably shown structures having but a single membrane, layer, or sheet across the window opening.

The structure of the present invention achieves the above objects by including a base sheet having window openings defined in predetermined areas thereof. The window openings and adjacent marginal portions thereof on at least one side of the base material are covered with a transparent window sheet which is secured to the base sheet along the marginal portions. At least one entire side of the transparent window sheet and adjacent portions of the base sheet are covered with a layer of transparent film.

The structure of the present invention also permits the placement and covering of windows or sight openings in cartons of the collapsible or knockdown type to facilitate shipment and storage thereof.

These and other objects and advantages of the invention will become apparent from the following detailed description.

BRIEF DESCRIPTION OF THE DRAWINGS

A clear conception of the improved window container packaging material may be had by referring to the drawings accompanying and forming a part of this specification wherein like reference characters designate the same or similar parts in the various views.

FIG. 2 is a similar diagrammatic view schematically illustrating the steps of a production method wherein typical so-called curtain coaters are utilized for applying the layer of film;

FIG. 5 is a similarly enlarged perspective view of an assembled carton formed from the blank of FIG. 4, a portion of the outer film layer being broken away;

FIG. 6 is a similar perspective view of another assembled carton in which the window as formed in the base material is merely defined by score lines to render the covering removable; and FIG. 7 is still another perspective view of a carton showing the window area formed by a plurality of panes bounded by reinforcing strips formed from the material of the base sheet.

DETAILED DESCRIPTION OF THE PREFERRED EMBODIMENT

While the invention has been shown and described herein as a packaging material especially applicable for use in a paperboard carton for liquid commodities or the like, which is illustrated as being scored and folded in a particular manner and as being provided with window openings in specific areas, it is not intended or desired to thereby unnecessarily limit the invention by reason of such limited embodiments. It is also contemplated that certain descriptive terminology such as "packaging material," , "packaging wrapper," and "transparent window sheet" as used herein shall be given the broadest possible interpretation consistent with the disclosure.

Figure 1:
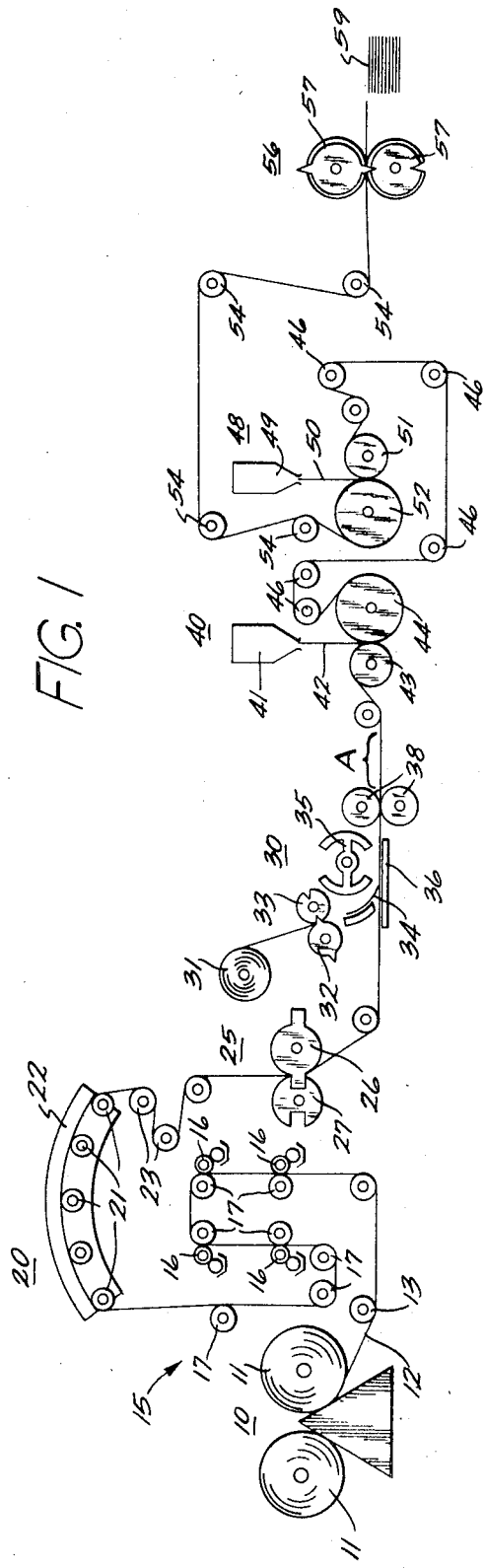
FIG. 1 is a diagrammatic view illustrating the several steps of a production method for the packaging material wherein one known type of extrusion coater is utilized for applying the layer of transparent film, the apparatus for performing the method being schematically depicted.

Referring first to FIG. 1 of the drawings, the numeral 10 is used to generally designate the supply station for the continuous web of paperboard stock or the like used as the base sheet in the formation of the improved wrappers or containers. The paperboard stock forming the base sheet may, of course, be selected according to the intended use of the wrappers or containers being produced, and while the web forming base sheet may be chemically treated, calendered, or the like, in accordance with customary commercial practice, it is generally uncoated.

The web is withdrawn from the supply roll 11 about a series of idler or guide rolls 13 to a printing station or press, generally designated by the numeral 15, which may be of the flexograph or other suitable type having a series of printing rollers 16 and backup rollers 17 all of which are suitably supported in a known manner. At the printing station 15, the surface of the web 12 which is ultimately to become the outer or exterior surface of the wrapper or carton is provided with the desired indicia applied in accordance with accepted commercial practice.

The web 12 is then advanced from the press or printing station 15 through a dryer or oven, generally designated by the numeral 20. The dryer which is likewise illustrated diagrammatically may be of any well-known construction such as those commercially used in drying printed surfaces of an advancing web. The printed web 12 is advanced through the dryer 20 over a series of spaced rollers 21 or the like located within a heated jacket or hood 22. As the web leaves the drying zone 20, it is advanced in a customary manner in surface contact about one or more chill rolls 23 preferably arranged in offset relation as shown in order to cool both sides of the advancing web.

As the printed web 12 is advanced beyond the chill rolls 23, it is guided through a cutting station, generally designated by the numeral 25, wherein the window or sight openings are cut in predetermined areas of the web. Again, the rotary knives for cutting the window openings are depicted diagrammatically, since these cutters are well known in the art. As diagrammatically illustrated, the cutter generally comprises a knife-carrying roll 26 and a mating roll 27 both of which are geared and timed with the printing press. At this cutting station, the windows of any desired configuration are defined by cutting the same in the advancing printed web 12, and these windows may obviously be located as desired so as to ultimately be positioned in any one or more of the walls of the final package, including the top, bottom or sidewalls as well as any gusset panels or the like.

After the window or sight openings are defined in the printed web at the cutting station 25, the web 12 is advanced through a station 30 wherein transparent or translucent window coverings are applied. At the station 30, transparent or translucent sheet stock is advanced from a supply roll 31 to cooperating cutters 32,33 which sever successive window coverings 34. The marginal edges of the successive window coverings 34 are suitably treated as by application of adhesive or the like and successively advanced in timed relation with the web 12 by a suitable feeding device 35 to one side of the web, preferably the unprinted side thereof, as the opposite side of the web is passed over a suitable support schematically shown at 36. The applicator shoes of the device 35 operating in timed relation with the advancing web 12 as hereinabove indicated apply the successive window coverings 34 to the web 12 so that each of the cut window areas are covered with a flexible transparent or translucent window sheet.

From the window covering station 30, the printed web with the covered sight openings therein is advanced by means of suitable draw and pressure rolls 38 or the like to an extrusion coating station 40 in the embodiment of FIG. 1. At the extrusion station 40, a suitable film forming material is extruded in a curtain from the extrusion die 41 to the surface of the web 12 to which the transparent or translucent window covering is applied. The extruded curtain 42 is fed to the web as it passes into the nip formed between a backup roll 43 and chill roll 44, such extrusion apparatus being also depicted diagrammatically since such apparatus is well known in the art. Since the extruded material possesses relatively high temperatures, it should be understood that the window coverings 34 should be of a material capable of withstanding these temperatures without deteriorating. I If it is desired to extrusion coat a film over only one side of the web 12, the web can be fed at this point directly to a final cutting and scoring die wherein it is severed into successive individual wrapper sheets or carton blanks 59. However, if it is desired to extrusion coat both sides of web 12, the web is advanced beyond the chill roll 44 over a series of guide rolls 46 to a second extrusion station 48, the web being reversed prior to passage through the second extrusion station. As in the case of the station 40, the extrusion station 48 also includes an extrusion die 49 from which a curtain 50 of extruded material is supplied to the web 12 as it enters the nip between a pressure roll 51 and chill roll 52, thus coating the previously uncoated side of the web.

From the extrusion coating station 48, the composite web is drawn over another series of guide rolls 54 to a cutting and scoring zone 56 wherein the cutting and scoring dies 57 sever the web into the successive individual wrapper or carton units 59 while also forming suitable fold lines therein. Again, the cutting and scoring dies at station 56 may be of any well known and commercially available design and these dies have been shown diagrammatically herein merely for purposes of illustration.

While extrusion coating apparatus of one well-known type is illustrated as used in the performance of the method in FIG. 1, the method may also be performed with utilization of a coating apparatus commonly referred to as a curtain coater. This embodiment is illustrated in FIG. 2, and in some instances the use of curtain coating apparatus instead of so-called extrusion coating apparatus possesses advantages. While the extrusion apparatus illustrated in FIG. 1 is adapted to apply coatings of conventional types of polyethylene and the like, the curtain coater such as used in the arrangement illustrated in FIG. 2 possesses various advantages, particularly wherein the coating is to be performed with low viscosity hot melts, such as wax, modified wax, lower molecular weight polyethylenes and the like, and in instances in which the base sheet is of irregular shape or odd configuration or is a discontinuous web.

In FIG. 2, the web 12 is withdrawn from the supply roll 11 and is advanced through the printing station 15, drying station 20, over the cooling rolls 23, through the window cutout station 25 and through the window covering applicator station 30 in the same manner as hereinabove described with reference to FIG. 1. However, immediately after the window coverings 34 have been applied to the advancing web 12, this web is severed into successive individual wrapper or carton units 68 while also being suitably scored to provide predetermined fold lines. This cutting and scoring is performed at the station 65 by a pair of cutting and scoring dies 66 with the successive blanks 68 being fed to the curtain coater 70.

The curtain coater 70 may be of well-known construction comprising a coating reservoir 71 to which a supply of the film forming material is suitably fed in a well-known manner. The sections or blanks 68 to be coated are fed past and beneath the reservoir 71 by an endless supporting belt 72 continuously driven by the guide and drive rolls 73. As each blank 68 passes below the reservoir 71, it receives a coating of the film forming material 74 being fed from the supply reservoir 71. The conveyor belt 72 then conveys the successive blanks 68 away from the curtain coating station 70.

If it is desired to curtain coat both sides of the successive blanks 68, they are successively advanced to a suitable inverter 76 wherein they are reversed by a series of radiating and rotating blades 77. From the blades 77 at the inverting station 76, the successive reversed blanks 68 are again conveyed by the conveyor 82 of a second curtain coater 80 past and below the supply reservoir 81 thereof. Again, the conveyor 82 of the curtain coater 80 is guided and driven by a series of rolls 83 and as the successive blanks 68 are passed below the supply reservoir 81 they receive the coating material 84 therefrom. The successive finished blanks designated by the numeral 59 as in the case of the finished blanks produced by the method depicted in FIG. 1, may then be stacked in a suitable manner for subsequent shipment and/or use.

Figure 3:
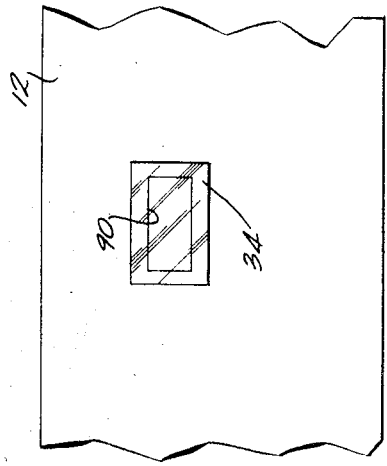
FIG. 3 is a somewhat enlarged plan view of a fragment of the web of packaging material within the area A of FIGS. 1 and 2.

From the foregoing, it is apparent that the web in the area A of either the method illustrated in FIGS. 1 or 2 consists of the base sheet 12 having window openings 90 defined at predetermined spaced localities with the window openings being covered by a transparent or translucent sheet 34 marginally secured to the base sheet 12 as shown in FIG. 3. However, in the method of FIG. 1, the extrusion coating 42 is subsequently applied to the continuous web so as to entirely cover the window covering and the adjacent surrounding area of the base sheet 12 whereas in the method of FIG. 2, the web 12 is first severed into successive units or blanks 68 which are then coated with the material 74 to cover the window covering and adjacent surrounding area of the base sheet.

Figure 4:
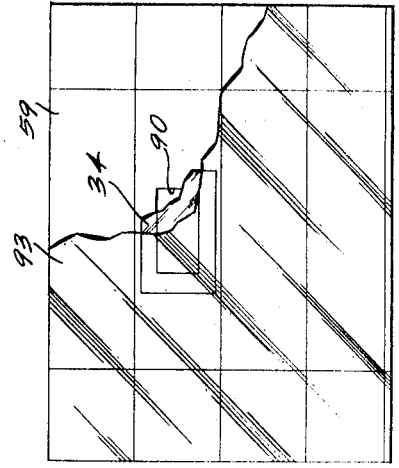
FIG. 4 is another enlarged plan view of a typical finished printed, coated, scored and cut carton blank incorporating the packaging material of the present invention, portions of the transparent film layer and window covering being broken away to more clearly reveal the construction.

In either case, the packaging material or blanks 59 of the present invention are as shown in FIG. 4, and these blanks, when assembled, may take the appearance of a carton such as that illustrated in FIG. 5. In other instances, it may be desirable to provide a packaging unit in which the window or sight opening remains initially covered by the portion 91 of the base sheet for removal by the consumer, such embodiment being shown in FIG. 6. In such case, the window cutting or scoring operation may be performed subsequent to the initial coating operation and is such as to leave the cut portion 91 at least partially attached to the base sheet 12 and permit its removal by the consumer. In still other instances, it may be found desirable to add strength and/or rigidity to the window area, and one effective way in which this may be accomplished is to form the window of a plurality of individual panes 92 as shown in FIG. 7.

The packaging wrapper 59 of the present invention thus comprises a base sheet 12 of paper, paperboard or the like having window openings 90,92 defined in predetermined areas thereof with the window defining openings being covered by a transparent window sheet 34 secured to the base sheet 12 entirely about the window defining opening. The entire window covering sheet 34 is, in turn, completely covered by a layer of transparent film 93 in the nature of an extrusion coating or the like which is secured over the entire area of the window sheet as well as to the adjacent surrounding portion of the base sheet. In one form, the window 90 may be entirely cut out of the base sheet 12 while in another form, the window defining portion 91 may be cut so as to remain in place for subsequent removal to uncover the window 90 and in still another form the window portion may consist of a plurality of grouped panes 92. Also, either one or both sides of the sheet forming the transparent window covering may be covered with the layer of transparent film 93, dependent upon the results desired. For example, in liquid packaging, it is preferable that the coated side of the sheet be exposed to the interior of the final package in order to provide the desired protection to the packaged product and leakproofness and strength to the final package.

It should be understood that the flexible window covering 34 may be of any suitable transparent or translucent material such as cellophane, Mylar, an appropriate polyolefin or the like, and this covering may be applied to the base sheet by suitable adhesives, heat sealing, static attraction or the like. The layer of transparent film 93 may, of course, also be of any suitable material capable of being extruded, laminated onto, applied by the curtain coating process or by other means, and the base sheet may or may not be supplied with printing on one or both sides as desired.

It is contemplated that any reference to the window covering as being transparent shall also be interpreted to include semitransparent films as well as translucent films capable of exposing the contents of the final package. Also, it is anticipated that the term packaging material shall mean carton stock as well as flexible wrapper stock such as used in fabricating soft packages or envelopes. Under any conditions, container packages fabricated from the packaging materials of this invention are extremely efficient and permit the contents of the package to be viewed from the exterior.

We claim:

1. A packaging material for containers having windows therein comprising, a single base sheet having a window opening defined in a predetermined area thereof, a transparent window sheet having a membrane portion covering the window opening and having marginal portions secured to one side of the base sheet adjacent the window opening, and a layer of transparent film covering and bonded to at least the membrane portion of the window sheet and the adjacent portions of the base sheet surrounding the window opening.

2. The packaging material according to claim 1, wherein both sides of the window sheet and the surrounding portions of the base sheet are covered with layers of film bonded thereto.

3. The packaging material according to claim 1, wherein the window openings are defined in the base sheet by incisions which leave the cut portions of the window openings at least partially attached to the base sheet to provide removable covers for the openings.

4. The packaging material according to claim 2, wherein the window openings are defined in both the base sheet and in one of the covering layers by incisions which leave the cut portions of the window openings at least partially attached to the base sheet to provide removable covers for the openings.

5. The packaging material according to claim 1, wherein the transparent window sheet is secured about its entire marginal area to one side of the base sheet and the layer of film covers and is bonded to the entire window sheet and the entire base sheet beyond the marginal edge of the window sheet.

6. The packaging material according to claim 1, wherein the base sheet is cut into individual units, each scored to define predetermined fold lines.

7. The packaging material according to claim 6, wherein said base sheet is folded upon the predetermined fold lines formed therein to form a container with the transparent window sheet and its covering film layer is disposed interiorly of the container.

8. The packaging material according to claim 1 wherein the layer of transparent film is formed of a transparent sealing substance bonded to the other side of the base sheet and through the window opening therein to the membrane portion of the window sheet for sealing the window opening against leakage.

9. The packaging material according to claim 1 wherein the layer of film is also bonded to one side of the base sheet and to one entire side of the window sheet to assist in securing the window sheet to the base sheet.

10. The packaging material according to claim 1 wherein the window sheet is formed of a rupture resistant supportive material and said layer of transparent film is formed of a transparent sealing substance supported by the window sheet for sealing the window opening against leakage.

11. The packaging material according to claim 10 suitable for forming a leak proof container for storing contents wherein the window sheet is formed of a supportive material pervious to the contents, and the layer of transparent film is formed of a substance impervious to the contents supported by the window sheet.

12. The packaging material according to claim 10 wherein the window sheet is formed of cellophane and the layer of transparent film is formed of polyethylene.

13. A packaging material for containers having windows therein comprising, a single base sheet having a window opening defined in a predetermined area thereof, a transparent window sheet having a membrane portion covering the window opening and having marginal portions secured to one side of the base sheet adjacent the window opening, and a layer of transparent film covering at least the membrane portion of the window sheet and bonded to the adjacent portions of the base sheet surrounding the window opening for securement over said membrane portion.

14. The packaging material according to claim 13 wherein both sides of the window sheet are covered with a layer of transparent film bonded to the adjacent portions of the base sheet surrounding the window opening.

15. The packaging material according to claim 13 wherein the layer of transparent film is bonded to the adjacent portions of the base sheet on the other side thereof from that on which the transparent window sheet is secured.

16. The packaging material according to claim 13 wherein the layer of film is bonded to the one side of the base sheet around the marginal portions of the transparent window sheet.